US008556457B2

(12) United States Patent  
Kiser

(10) Patent No.: US 8,556,457 B2  
(45) Date of Patent: Oct. 15, 2013

(54) SINGLE COLOR LED CLUSTERS FOR IMAGE GENERATION

(71) Applicant: Seiko Epson Corporation, Tokyo (JP)

(72) Inventor: David Kerry Kiser, Sherwood, OR (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/796,408

(22) Filed: Mar. 12, 2013

(65) Prior Publication Data

US 2013/0188346 A1 Jul. 25, 2013

Related U.S. Application Data

(63) Continuation of application No. 13/308,450, filed on Nov. 30, 2011, now Pat. No. 8,414,146, which is a continuation of application No. 12/233,513, filed on Sep. 18, 2008, now Pat. No. 8,083,378.

(60) Provisional application No. 60/994,408, filed on Sep. 18, 2007.

(51) Int. Cl.  
*F21V 9/00* (2006.01)

(52) U.S. Cl.  
USPC .. 362/231; 362/296.02; 362/293; 362/249.02

(58) Field of Classification Search  
USPC .......... 362/213, 293, 249.02, 296.02, 296.09, 362/583  
See application file for complete search history.

(56) References Cited

U.S. PATENT DOCUMENTS

| 4,894,760 | A | 1/1990 | Callahan |
| 6,270,244 | B1 | 8/2001 | Naum |
| 6,817,745 | B2 | 11/2004 | Leung |
| 2001/0048493 | A1 | 12/2001 | Swanson et al. |
| 2004/0062040 | A1 | 4/2004 | Blume et al. |
| 2006/0002109 | A1 | 1/2006 | Imade |

OTHER PUBLICATIONS

Densitron Technologies PLC. LED Color Chart. (http://replay.web.archive.org/20071104122737/http://densitron.com/displays/led_color_chart.aspx; retrieved Apr. 20, 2011).  
LEDtronics Color Chart. (http://www.ledtronics.com/html/colorchart.htm ; retrieved Apr. 20, 2011).  
TheLEDLight.com Led Color Chart. (http://replay.web.archive.org/20051126164601/http://www.theledlight.com/color_chart.html ; retrieved Apr. 20, 2011).  
Aug. 15, 2012 Office Action issued in U.S. Appl. No. 13/308,450.  
Dec. 10, 2012 Notice of Allowance issued in U.S. Appl. No. 13/308,450.  
Jun. 16, 2012 Office Action issued in U.S. Appl. No. 12/233,513.  
Nov. 4, 2010 Office Action issued in U.S. Appl. No. 12/233,513.  
Apr. 28, 2011 Office Action issued in U.S. Appl. No. 12/233,513.  
Nov. 22, 2011 Notice of Allowance issued in U.S. Appl. No. 12/233,513.

*Primary Examiner* — Evan Dzierzynski  
*Assistant Examiner* — Danielle Allen  
(74) *Attorney, Agent, or Firm* — Oliff & Berridge, PLC

(57) ABSTRACT

A display device for increasing brightness of an image generation, including a color cluster system, is provided. The system includes a first color LED cluster having at least a first LED of a first wavelength within a first color range and a second LED of a second different wavelength within the first color range. The light from the first LED may be combined at least partially with light from the second LED The system further comprises a second color LED cluster having at least a first LED of a first wavelength within a second color range and a second LED of a second different wavelength within the second color range. In the second color LED cluster, the light from the first LED may be combined at least partially with light from the second LED.

26 Claims, 4 Drawing Sheets

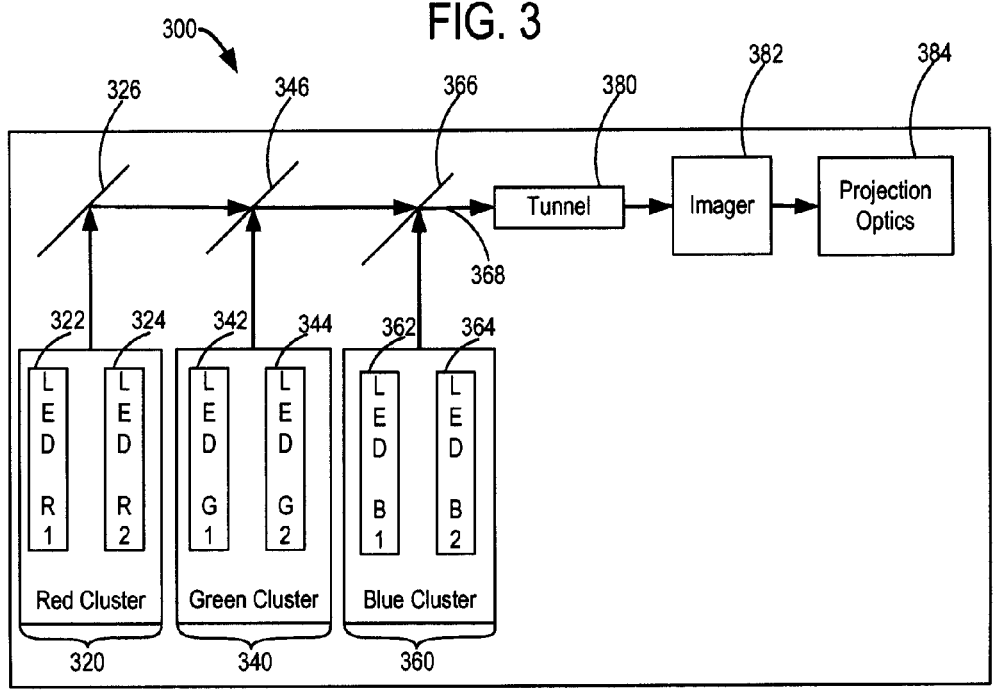
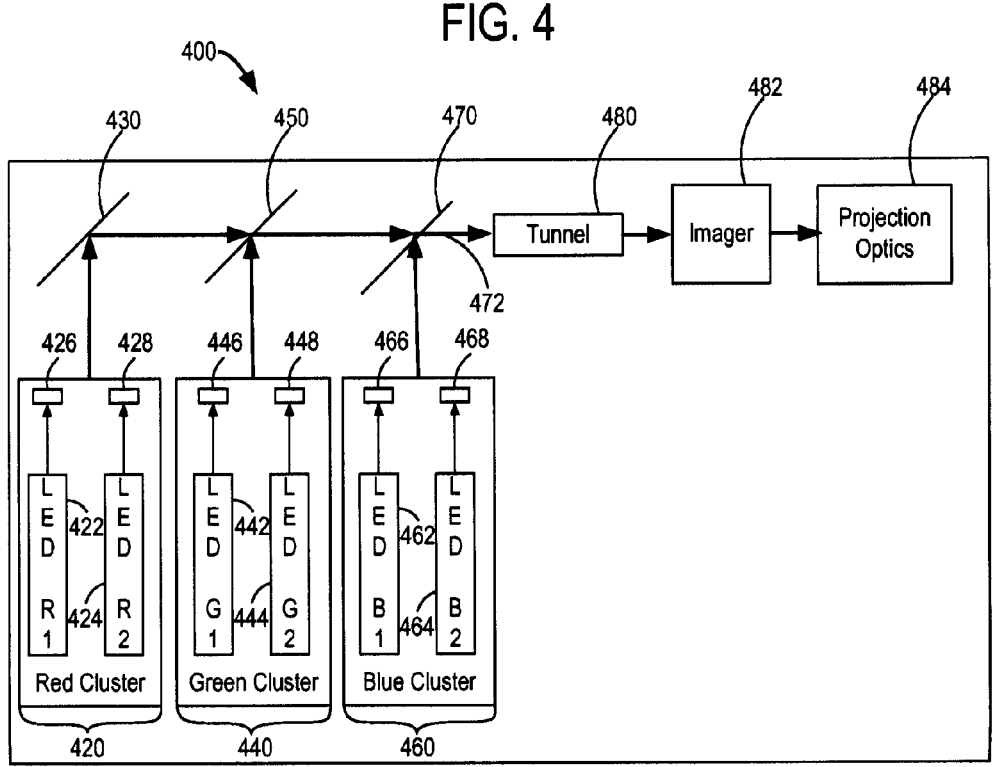

SINGLE COLOR LED CLUSTERS FOR IMAGE GENERATION

CROSS-REFERENCE TO RELATED APPLICATIONS

This application is a continuation of U.S. patent application Ser. No. 13/308,450 filed on Nov. 30, 2011, which is a continuation of U.S. patent application Ser. No. 12/233,513 filed on Sep. 18, 2008 (now U.S. Pat. No. 8,083,378), which claims priority to Provisional Application No. 60/994,408 filed on Sep. 18, 2007, the entire contents of all related applications are hereby incorporated by reference.

BACKGROUND

Display devices, such as projection systems, have been used for many years to project motion pictures and still photographs onto screens for viewing. For example, display devices, including front projection systems and rear projection systems, have become business tools, presentation tools, multi-media displays, home entertainment devices, signage, etc.

Conventional projection systems have employed a broad spectrum light source, a color wheel, an image-forming device, such as a digital micro mirror (DMD), and various projection optics to generate and project an image onto a display screen.

Significant effort has been invested into developing display devices that produce bright, high-quality, color images. However, the optical performance of conventional display devices has often been less than satisfactory. For example, suitable projected image brightness is difficult to achieve, especially when using compact portable color projectors in a well-lighted room or in an outdoor environment. As an example, such display devices typically use high intensity arc lamps as their light source and then filter out all of the light except for red, green, and blue light and employ three separate light paths or some forms of sequential color modulator to coordinate color image data. Alternative projection systems, such as light emitting diode (LED) systems, are being developed. The interest in employment of LEDs as light sources for projection systems has been based in part on the potential of the increase in the light output of the LEDs. Moreover, LED light sources may have "instant-on", long life (thus no lamp replacements needed for the life of the product), broad color gamut (color range), and no hazardous chemical (like mercury) contamination or disposal issues. However, current LED illuminated optical engines have been too dim to attract much marketplace interest and as such LEDs have not been able to become a replacement for standard high pressure mercury lamps or xenon lamps.

SUMMARY

A system of single color LED clusters for image generation is provided. The inventor herein has recognized a system for increasing brightness using a single color LEDs for image generation. For example, the display device may include a first color LED cluster having at least a first LED of a first wavelength within a first color range. The display device may further include a second LED of a second different wavelength within the first color range. In this way, light from the first LED may be combined at least partially with light from the second LED. The display device may further include a second color LED cluster having at least a first LED of a first wavelength within a second color range and a second LED of a second different wavelength within the second color range. In this way, light from the first LED of a first wavelength within a second color range may be combined at least partially with light from the second LED of a second different wavelength within the second color range.

BRIEF DESCRIPTION OF THE FIGURES

FIGS. 1-4 are example schematic views of a projection system including an LED light source according to embodiments of the present disclosure.

DETAILED DESCRIPTION

Figure 1:
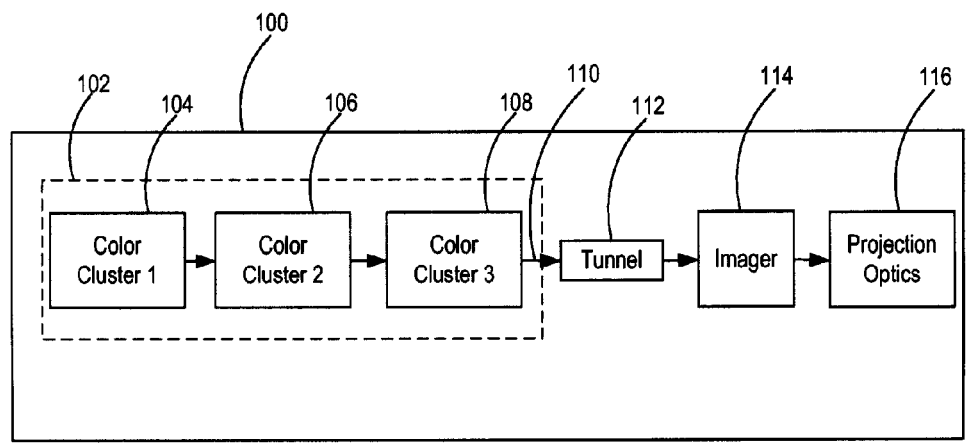

FIG. 1 illustrates a display device 100 including a color cluster system 102 for image generation. As illustrated, color LED clusters may include light sources with a peak wavelength separation and wavelength selection filters (e.g. dichroic filters) to reduce overlap of light source spectra and narrow light source bandwidth. Light from color LED clusters 104, 106, and 108 can be combined and directed along an optical path 110 to a light tunnel 112, imager 114, and through projection optics 116 to make up the display device 100. The color cluster system 102 may include one or more color LED clusters. In this example, a color cluster 1 102, a color cluster 2 104, and a color cluster 3 104 may be included in the color cluster system 102.

A display device 100 may be, for example, a front projection system or rear projection system for projecting an image (e.g. motion picture, still photographs) to a display, such as a screen. The color LED clusters of the color cluster system 102 may include light of a specific color wavelength range. For example, color cluster 1 104 may include light sources with wavelengths in a red color range, color cluster 2 106 may include light sources with wavelengths in a green color range, and color 3 108 may include light sources with wavelengths in a blue color range. Thus, the color LED clusters may combine to create white light, in this example. In another example, the optical path of a first LED cluster may be kept independent of optical paths of other LED clusters. For example, the optical paths of light from a red cluster, a green cluster, and a blue cluster may be mutually independent of each other such that a red optical path, green optical path, and blue optical path are produced.

Although three color LED clusters are illustrated in FIG. 1, it may be appreciated that any number of color LED clusters may be included in the color cluster system 102. For example, one red color LED cluster and a blue light source may be provided. In another example, color LED clusters with color sub-divisions (e.g. red, green, blue, cyan and magenta) may be provided. Further, although FIG. 1 is illustrates combining red, green and blue color LED clusters, it may be possible to use different color LED clusters. Ranges for the various color LED clusters are provided below. As described above, for each color LED cluster, multiple LEDs may be employed, each with a slightly different wavelength, but still within the color range.

| | |
|---|---|
| violet | 380-450 nm |
| blue | 450-495 nm |
| green | 495-570 nm |
| yellow | 570-590 nm |
| orange | 590-620 nm |
| red | 620-750 nm |

Each color cluster system may include one or more light sources combined to form light within the color range of the color LED cluster. In one example, color LED clusters may include light sources of non-overlapping spectra such that light can be maximally combined. In another example, light sources may be passed through wavelength selection filters of narrow bandwidth such that the light sources are filtered to have narrower bandwidths. In yet another example, the light sources may have non-overlapping spectra and be passed through wavelength selection filters of narrow bandwidth.

To achieve light sources of non-overlapping spectra, different wavelength LEDs of the same color may be generated by the LED manufacturer. For example, the LED manufacturer may selectively "bin" (or separate) slightly different LEDs. The "high" wavelength LEDs and "low" wavelength LEDs of a standard manufacturing yield process of a given color may naturally result, as there is some variation during the manufacturing process, including where the peak wavelength of a given LED happens to be. Wavelength selection filters may be made to match the different wavelengths of the binned LEDs.

In another approach, the LED manufacturer may manufacture LEDs of slightly different wavelengths as requested according to the specific wavelength selection filters. As an example, the manufacturer may alter the thin film coatings, (e.g., the epitaxial thin film coating, or "epi") on the LED substrates in order to generate photons at slightly different wavelengths with a narrow spectrum width.

Thus, LEDs with non-overlapping spectra may be selected for use in the embodiments herein. In one example of the application, LEDs with narrow spectra and non-overlapping spectra are selected and wavelength selection filters may be matched with the LEDs. For example, the wavelength selection filters may be bandpass filters centered about the peak wavelength of its respective LED. In one example, the embodiments exploit the use of the binned LEDs with narrow spectra widths and non-overlapping spectra to optimize the increase in brightness due to combination of the LED clusters. In another example, LEDs with broader spectra and/or with overlapping spectra may be utilized; in this case, a submaximal brightness boost (where brightness boost includes an increase in photopic output compared to photopic output of one light source) may be realized.

Figure 2:
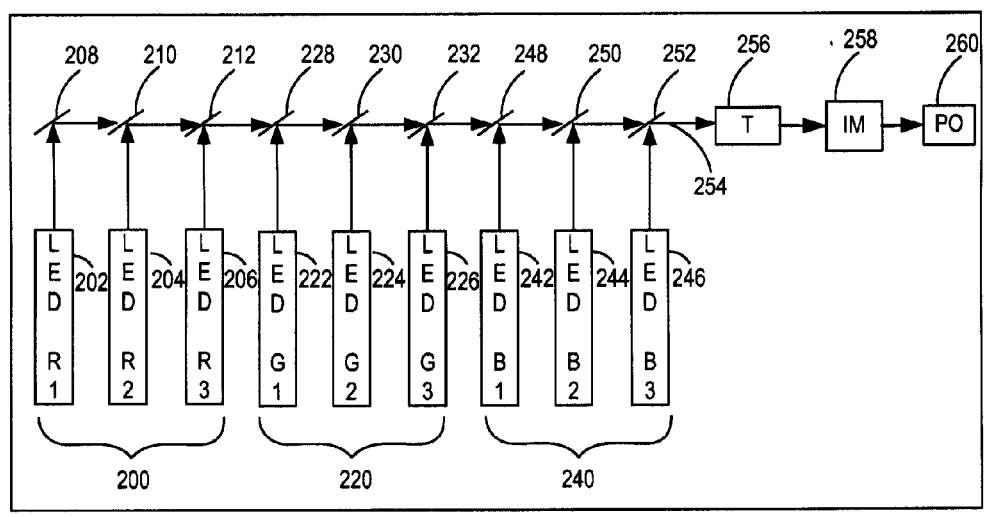

FIG. 2 shows a schematic depiction of an exemplary LED light source employing single color LED clusters for image generation for a projection system. As illustrated in FIG. 2, the light sources may be LEDs. Three single color LED clusters are illustrated as a red cluster 200, a green cluster 220, and a blue cluster 240. Each single color LED cluster includes LEDs which are of slightly different bandwidths, where the bandwidths remain within the desired color spectrum range. The LED light of the same color spectrum may be combined using wavelength selection filters. The wavelength selection filters can be used to further narrow the spectra of the LEDs and to combine the light from the LEDs, as described further with respect to FIG. 5. In this way when the light of multiple LEDs in the same color LED cluster are combined it may average a desired color bandwidth and may be brighter than a single color LED light.

In FIG. 2, as an example, in a red cluster 200, three distinct red LEDs, 202, 204, and 206 are shown. The color spectrum range for red is considered approximately 620-750 nm. Thus, in one embodiment, three LEDs are provided, one centered on the low end of the red color range (620-670 nm), LED R1 202, one centered approximately in the center of the red color range (685 nm), LED R2 204, and one centered in the high end of the red color range (e.g. 700-750 nm), LED R3 206. Light from each LED may be passed through a lens, for example, to a wavelength selection filter. The wavelength selection filter associated with an LED may be centered on or about the peak wavelength of the respective LED such that the light from the red low filter 208 is passed through the red center filter 210 and the red high filter 212, such that the various lights are combined to generate a brighter red light composed of red light of various bandwidths while still remaining within the red color range. It may be appreciated that, in this embodiment, the red low wavelength selection filter 208 may be designed to reflect light centered in the low end of the range (620-670 nm) along an optical path 254 as depicted and to pass light of other wavelengths. The red light may be directed along an optical path 254 toward the green LED light.

Similarly, green cluster 220 is shown with three green LEDs of varying wavelengths with corresponding wavelength selection filters. For example, the color spectrum for green is generally considered between 495-570 nm. A green low LED G1 222 and green low wavelength selection filter 228 may be centered on the lower end of the green color range, a green center LED G2 224 and green center wavelength selection filter 230 may be centered on the middle of the green color range and a green high LED G3 226 and green high wavelength selection filter 232 may be centered on a high end of the green color range. The light from the green cluster may be combined, averaging light within the wavelength range of the green color range. Filters 228, 230, and 232 may pass the red light to combine with the green light reflected by the filters 228, 230, and 232 such that the two light bands may be directed along an optical path 254. Thus, the green light may be directed with the red light along the optical path 254 towards blue LED light.

Likewise, blue cluster 240 is shown with three blue LEDS of varying wavelengths with corresponding filters. For example, the color spectrum for blue is generally considered between 450-495 nm. A blue low LED B1 242 and blue low wavelength selection filter 248 may be centered on the lower end of the blue color range, a blue center LED B2 244 and blue center wavelength selection filter 250 may be centered on the middle of the blue color range and a blue high LED B3 246 and blue high wavelength selection filter 252 may be centered on a high end of the blue color range. Thus, the light from the blue cluster may be combined, averaging light within the blue color range. Wavelength selection filters 248, 250, and 252 may pass the red and green light to combine with the blue light reflected by the filters 248, 250, and 252 such that the three light bands may be directed along an optical path 254.

The light from the LED clusters 200, 220, and 240 may be combined along optical path 254 to produce white light. Alternately, the color LED cluster light paths may be kept independent of each other, as described above.

As shown, the light from the various LED clusters, 200, 220, and 240 may be combined to increase the brightness of a display device. Once combined, the light may be directed through a light tunnel 256 to an imager 258 through projection optics 260 to a display, such as a screen (not shown).

Although three LEDs are illustrated per color LED cluster in FIG. 2, it should be appreciated that any number of LEDs per color LED cluster may be used. For example, four or more LEDs may exist per color LED cluster. In other examples, FIGS. 3-4 illustrate embodiments including two LEDs per color LED cluster.

Turning now to FIG. 3, another schematic depiction of an exemplary display device is illustrated at 300. In this example, the system provides two LEDs for the red cluster, two LEDs for the green cluster, and two LEDs for the blue cluster. For each of these six LEDs there may be six different wavelength selection filters or a combination of wavelength selection filters and mirrors. The light output from all six LEDs of the three color LED clusters may be coincident (or co-axial) and thus may act as a single light source going to the display imager (typically a microdisplay). However, as discussed above, the optical paths of each cluster may be mutually independent.

As illustrated, each LED cluster, e.g. red LED cluster 320, green LED cluster 340 and red LED cluster 360, has two LEDs. For example, red LED cluster 320 has LED R1 322, which is a red LED of a first wavelength and LED R2 324, which is a red LED of a second wavelength. Similarly, green LED cluster 340 has LED G1 342, which is a green LED of a first wavelength and LED G2 344, which is a green LED of a second wavelength. Likewise, blue LED cluster 360 has LED B1 362, which is a blue LED of a first wavelength and LED B2 364, which is a blue LED of a second wavelength. As described above the light from each LED in the cluster is directed to a wavelength selection filter which then combines with the light from the previous color LED clusters. Thus, the red light from the two red LEDs of red cluster 320 is directed via a wavelength selection filter 326 to the light from the green LED cluster 340. The green light from the two green LEDs of green cluster 340 is directed via the wavelength selection filter 346 to the light from the blue LED cluster 360. The red light is passed by the wavelength selection filter 346 such that the red light and green light are directed to the light from the blue LED cluster 360. The red light and green light are passed by the blue wavelength selection filter 366, along with the reflected blue light from the blue wavelength selection filter, to light tunnel 380. In this case, the wavelength selection filters 326, 346, and 366 may have broad ranges for the red, green, and blue color range respectively. The light may pass through a series of optics along a light path 368 to an imager 382 and onto projection optics 384.

FIG. 4 provides another illustration of the use of single color LED clusters in a display device at 400. A red cluster 420, green cluster 440, and blue cluster 460 are depicted. Here, light from LED R1 422 is passed through a wavelength selection filter 426, for example a lens, centered about the peak wavelength of LED R1 422 to further narrow the spectrum bandwidth. Similarly, light from LED R2 424 is passed through a wavelength selection filter 428 centered about the peak wavelength of LED R2 424. Thus, light with minimally-overlapping spectra, within the red color range, is reflected by a mirror or wavelength selection filter at 430 and directed along optical path 472.

In the green cluster 440, light from LED G1 442 is passed through a wavelength selection filter 446 centered about the peak wavelength of LED G1 442 to further narrow the spectrum bandwidth. Similarly, light from LED G2 444 is passed through a wavelength selection filter 448 centered about the peak wavelength of LED G2 444. Thus, light with minimally-overlapping spectra, within the green color range, is reflected by a wavelength selection filter at 450, combining with light from the red cluster 420.

Likewise, in the blue cluster 460, light from LED B1 462 is passed through a wavelength selection filter 466 centered about the peak wavelength of LED B1 462 to further narrow the spectrum bandwidth. Similarly, light from LED B2 464 is passed through a wavelength selection filter 468 centered about the peak wavelength of LED B2 464. Thus, light with minimally-overlapping spectra, within the blue color range, is reflected by a wavelength selection filter at 470, combining with light from the red cluster 420 and the green cluster 440.

The wavelength selection filters 430, 450, and 470 may have broad ranges for the red, green, and blue color range respectively. The light may be directed along an optical path to a light tunnel 480 to an imager 482 and through projection optics 484 for display on a screen (not shown). As shown, the light from the various LED clusters 420, 440, and 460 may be combined as in FIG. 4 so as to increase the brightness of a display device and may provide larger color gamut options.

As an example, if two LEDs of blue LED cluster 460 were to be combined, one centered around 465 nm and one centered around 485 nm, then the combined light would center around 475 nm. With wavelength selection filters which were also centered at 465 nm and 485 nm, and with bandwidth cutoff points such that the resultant light wavelengths did not overlap, and if the two different blue LEDs stayed within the cutoff limits of the wavelength selection filters, then the light from each blue LED may theoretically combine completely, doubling the lumens output, resulting in a 100% brightness increase over a single LED system.

It may be appreciated that in alternate embodiments, LED clusters may comprise two or more LEDs and, further, there may be one or more LED clusters.

Figure 5:
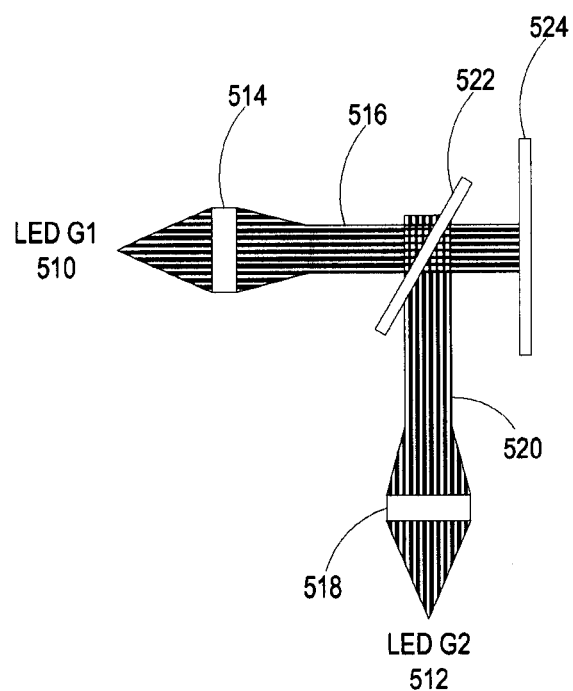
FIG. 5 shows an example schematic view of light source combination.

FIG. 5 shows a schematic view of a system for combining light sources, for example in the embodiments described above, while maintaining the etendue, or spread of light, of a single light source. Further, if the light sources have different spectra, a brightness boost may result, wherein the photopic output of the combined light sources may be greater than the photopic output of a single light source. For example, the measured lumens output of the light sources may be greater than the measured lumens output of a single light source.

In the example shown, two light sources LED G1 510 and LED G2 512, may be combined. Light from LED G1 510 is collected at a collection optic 514, for example a lens, and may be directed along a path 516. Likewise, light from LED G2 512 is collected by a second collection optic 518 and is directed along a path 520. Light paths 516 and 520 may intersect at a wavelength selection filter 522. The wavelength selection filter 522 may combine the light paths and redirect the new combined light path to a tunnel 524, in this example.

Although two light sources are illustrated in FIG. 5, it may be appreciated that there may be more than two light sources combined in this way. Further, although LED light sources are illustrated in FIG. 5, it may be appreciated that light paths from color LED clusters may be combined in this manner.

Figure 6:
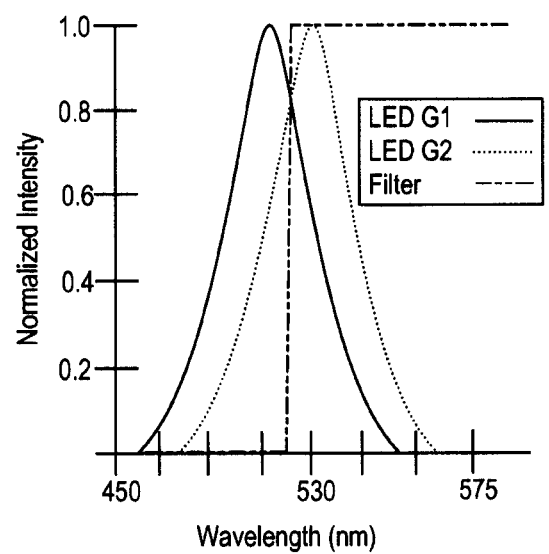
FIG. 6 shows an example graph depicting separation of LED wavelength spectra using a filter.

In FIG. 6, example spectra for 2 LEDs with spectra in the same color range are illustrated. For example, LED G1 442 is centered about 516 nm and LED G2 444 is centered about 528 nm. Here, a curve of a low-pass filter with a cut-off at 523 nm that may be applied to LED G2 444 is shown. It may be appreciated that a second, high-pass filter may be applied to LED G2 444 to comprise a band-pass filter which may be applied to LED G2 444. Further, a similar band-pass filter with appropriate cut-off values may be applied to LED G1 442. In this way, the spectra for LED G1 442 and LED G2 444 can be narrowed to provide non-overlapping, narrow-bandwidth light directed to green wavelength selection filter 450 of FIG. 4, for example, for optimal combination of light from LED G1 442 and LED G2 444. In another example, a low-pass filter, such as that shown in FIG. 6 may be applied to LED G2 444 and a high-pass filter may be applied to LED G1 442 such that the spectra of LED G1 and LED G2 are non-overlapping.

It may be appreciated that although LED G1 and LED G2 are shown in FIG. 6, any two light sources may be filtered in the same way as described with respect to FIG. 6, regardless of degree of spectra overlap. Further, although LED spectra are shown in FIG. 6, it may be appreciated that the spectra may be color LED cluster spectra. Thus, color LED cluster spectra may be filtered in the same way as described with respect to FIG. 6, regardless of degree of spectra overlap. Further, it may be appreciated that, in some examples, one or more light sources and one or more color LED clusters may not be passed through a wavelength selection filter and/or may be passed through one or more wavelength selection filters.

Although FIG. 6 shows a filter with a transition from 10% transmissive to 90% transmissive occurring over 2 nm, filter transition from 10% transmissive to 90% transmissive may occur over 12-15 nm. Additionally, the maximum transmittance for a typical dichroic filter may be 95-97% in the pass band and the reflective band may be less than 1% which may be close to ideal.

It may be appreciated that the wavelength selection filters for LED G1 442 and LED G2 444 may be configured such that the resultant spectra of LED G1 442 and LED G2 444 have overlapping regions. The amount of brightness boost may depend on the amount of spectra overlap with a greater brightness boost resulting as spectra overlap is reduced.

Figure 7:
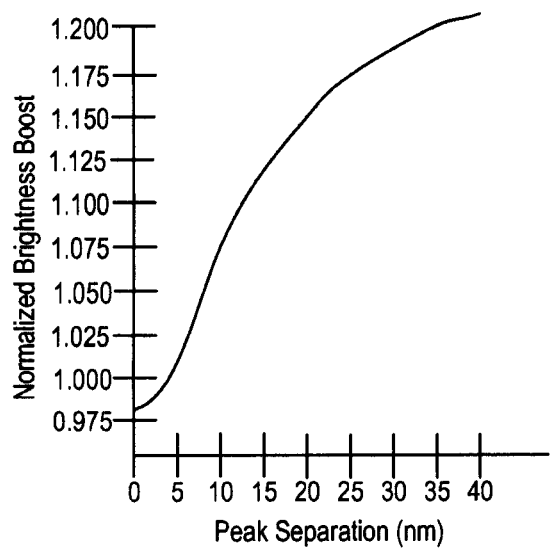
FIG. 7 shows predicted normalized brightness boost as a function of light source peak wavelength separation.

In FIG. 7, a normalized brightness boost curve as a function of a wavelength peak separation is illustrated. As the peak separation of two light sources increases, the normalized brightness boost increases. In this example, a brightness boost of 20% is obtained with a peak separation of 40 nm. It may be appreciated that this is one example and greater or lesser brightness boosts may be obtained at the peak separation depending on the light source spectra and wavelength selection filters applied, as described below.

Further, in some examples with light sources of equivalent radiometric power, as wavelength peak separation increases, the light source with spectra closer to a combined photopic curve may begin to dominate such that the cumulative effect of the second LED may be reduced. That is, the photopic power of one light source may contribute to a greater degree than a second light source to the combined-light photopic curve. It may be appreciated that this effect may be reduced with narrower bandwidth sources including LEDs, lasers, etc. Further, this effect may be reduced with narrower bandwidth sources because overlapping regions of spectra from the combined light sources may be reduced. Narrower bandwidth light sources may be achieved by the use of one or more band-pass wavelength selection filters, for example.

In practice, the LEDs may be run at full power to maximize overall brightness. Further still, the radiometric output power of LEDs may not vary significantly with locally varying wavelength. Thus, in some examples, combining light sources with varying wavelengths and narrow bandwidth spectra may be used in radiometric applications.

It may be appreciated that the embodiments disclosed herein may include alternate light sources including lasers or other sources for projection displays.

Further, it should be appreciated that a method for carrying out setup and operation of the display device is also disclosed using the single color LED clusters. In one example method, the method may include selecting LEDs with non-overlapping wavelength spectra. For example, a first LED in the green color range may be an LED with a spectrum of 495-525 nm, a second LED in the green color range may be an LED with a spectrum of 535-565 nm, and a third LED with a spectrum of 650-700 nm may be selected from a supply of LEDs. Further, the method may include filtering LED light output with band-pass wavelength selection filters centered about the LED peak wavelength such that the bandwidth of LED light output is narrowed. For example, the first LED in the green color range may be filtered with a wavelength selection filter centered at 510 nm and having a low cut-off of 500 nm and a high cut-off of 520 nm, such that the light output of the first LED in the green color range, after filtering, has a bandwidth of 500-520 nm. The method may further include combining the filtered LED light of the first LED in the green color range with the filtered LED light of the second LED in the green color range to increase brightness of light within the green color range. Further, the method may include combining light output in the green color range with light of the red color range.

As described herein, single light LED clusters may improve the brightness of LED for optical engines for display devices (such as in projectors and rear projection televisions) which may be much brighter. Further, it may be appreciated that larger color gamut options may be provided in some examples of the disclosed application compared to color gamut options without combination of light sources. Combined LEDs per color may help to enable LED powered optical engines while retaining the benefits of LED systems, including instant-on, long life, broad color gamut, minimal hazardous chemical contamination or disposal issues.

It is believed that the disclosure set forth above encompasses multiple distinct inventions with independent utility. While each of these inventions has been disclosed in its example embodiments, the specific embodiments thereof as disclosed and illustrated herein are not to be considered in a limiting sense as numerous variations are possible.

The subject matter of the inventions includes all novel and non-obvious combinations and subcombinations of the various elements, features, functions and/or properties disclosed herein. Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

What is claimed is:

1. A display device comprising:
   a first light source of a first peak wavelength within a first color range;
   a second light source of a second peak wavelength within the first color range, the second peak wavelength is different from the first peak wavelength;
   a third light source of a third peak wavelength within a second color range;
   a fourth light source of a fourth peak wavelength within the second color range, the fourth peak wavelength is different from the third peak wavelength; and
   a first wavelength selection filter configured to filter a narrow bandwidth of light from the first light source.

2. The display device of claim 1, further comprising:
   a second wavelength selection filter configured to filter a narrow bandwidth of light from the second light source.

3. The display device of claim 1, wherein the first wavelength selection filter is configured to filter narrow bandwidths of light of the first light source centered about the first peak wavelength.

4. The display device of claim 3, wherein the first wavelength selection filter is a band-pass filter centered at the first peak wavelength.

5. The display device of claim 1, further comprising:
a third wavelength selection filter configured to filter a narrow bandwidth of light from the third light source; and
a fourth wavelength selection filter configured to filter a narrow bandwidth of light from the fourth light source.

6. The display device of claim 1, wherein the first light source of the first peak wavelength has non-overlapping spectra with the second light source of the second peak wavelength.

7. The display device of claim 1, further comprising:
a light tunnel through which combined light is directed, an imager, and
a projection optics device configured to receive light from the imager.

8. The display device of claim 1 further comprising:
a first light combiner configured to combine light of the first light source and light of the second light source.

9. The display device of claim 8, wherein the first light combiner is a wavelength selection filter configured to pass light of the first light source and reflect light of other light sources.

10. The display device of claim 8 further comprising:
a second light combiner configured to combine light combined by the first light combiner and light of the third light source.

11. The display device of claim 10 wherein, the second light combiner is a wavelength selection filter configured to pass the combined light and reflect light of the third light source.

12. The display device of claim 1, wherein at least one of the light sources is a LED.

13. The display device of claim 1, wherein at least one of the light sources is a laser.

14. A display device comprising:
a first color light source cluster having at least a first light source of a first peak wavelength within a first color range and a second light source of a second peak wavelength within the first color range, the second peak wavelength being different from the first peak wavelength;
a second color light source cluster having at least a third light source of a third peak wavelength within a second color range and a fourth light source of a fourth peak wavelength within the second color range, the fourth peak wavelength being different from the third peak wavelength; and
a fifth light source of a fifth peak wavelength within a third color range.

15. The display device of claim 14, further comprising:
a first light combiner configured to combine light of the first color light source cluster and one of light of the second color light source cluster and light of the fifth light source.

16. The display device of claim 15, wherein the first light combiner is a wavelength selection filter configured to pass light of the first color light source cluster and reflect one of light of the second color light source cluster and light of the fifth light source.

17. The display device of claim 15 further comprising:
a second light combiner configured to combine light combined by the first light combiner and a remaining one of light from the second color light source cluster and light from the fifth light source.

18. The display device of claim 17, wherein the second light combiner is a wavelength selection filter configured to pass the combined light and reflect the remaining one of light from the second color light source cluster and light from the fifth light source.

19. The display device of claim 14, further comprising:
a first wavelength selection filter configured to filter a narrow bandwidth of light from the first light source.

20. The display device of claim 19, further comprising:
a second wavelength selection filter configured to filter a narrow bandwidth of light from the second light source.

21. The display device of claim 19, wherein the first wavelength selection filter is configured to filter narrow bandwidths of light of the first light source centered about the first peak wavelength.

22. The display device of claim 21, wherein the first wavelength selection filter is a band-pass filter centered at the first peak wavelength.

23. The display device of claim 16, wherein the first light source of the first peak wavelength has non-overlapping spectra with the second light source of the second peak wavelength.

24. The display device of claim 14, further comprising:
a light tunnel through which combined light is directed;
an imager; and
a projection optics device configured to receive light from the imager.

25. The display device of claim 14, wherein at least one of the light sources is a LED.

26. The display device of claim 14, wherein at least one of the light sources is a laser.

* * * * *